(12) United States Patent
Yu

(10) Patent No.: US 7,077,445 B2
(45) Date of Patent: Jul. 18, 2006

(54) DUAL LEVER LOCKING HOOK

(75) Inventor: Chris Yu, Carson, CA (US)

(73) Assignee: Luggage America, Inc., Carson, CA (US)

( * ) Notice: Subject to any disclaimer, the term of this patent is extended or adjusted under 35 U.S.C. 154(b) by 0 days.

(21) Appl. No.: 10/315,768

(22) Filed: Dec. 10, 2002

(65) Prior Publication Data
US 2004/0036303 A1 Feb. 26, 2004

(30) Foreign Application Priority Data
Aug. 20, 2002 (KR) .................. 20-2002-0024769

(51) Int. Cl.
*B66C 1/36* (2006.01)
(52) U.S. Cl. .................. 294/82.19; 24/599.4; 24/600.9
(58) Field of Classification Search ............. 294/82.19, 294/82.1, 82.11, 82.12, 82.13, 82.14, 82.17, 294/82.2, 89; 24/599.4, 599.6, 599.8, 599.9, 24/600.1; D8/367; 403/78
See application file for complete search history.

(56) References Cited

U.S. PATENT DOCUMENTS

| | | | | |
|---|---|---|---|---|
| 482,885 | A * | 9/1892 | Wallace .................. | 24/599.1 |
| 644,699 | A * | 3/1900 | Woodford ................ | 294/82.2 |
| 988,499 | A * | 4/1911 | Owen .................... | 24/600.9 |
| 1,209,615 | A * | 12/1916 | Obsboum ................ | 24/599.5 |
| 3,194,598 | A * | 7/1965 | Goldfuss ................. | 294/82.1 |
| 3,213,508 | A * | 10/1965 | Vigerhed ................ | 294/82.19 |
| 4,577,374 | A * | 3/1986 | Lii ....................... | D8/367 |
| 4,708,382 | A * | 11/1987 | LaCount ................. | 294/82.1 |
| 4,858,977 | A * | 8/1989 | Mitchell ................. | 294/82.11 |
| 4,868,954 | A * | 9/1989 | Kasai .................... | D8/367 |
| 5,103,755 | A * | 4/1992 | Garrett .................. | 294/82.1 |
| 5,127,137 | A * | 7/1992 | Krauss .................. | 24/265 R |
| 5,127,219 | A * | 7/1992 | Herron et al. ........... | 24/599.4 |
| 5,274,887 | A * | 1/1994 | Fudaki .................. | 24/600.9 |
| 5,480,202 | A * | 1/1996 | Gloden .................. | 294/82.2 |
| D394,202 | S * | 5/1998 | Anscher ................. | D8/367 |
| D407,297 | S * | 3/1999 | Mihailovic .............. | D8/367 |
| 5,913,479 | A * | 6/1999 | Westwood, III .......... | 24/298 |
| 5,937,490 | A * | 8/1999 | Mihailovic .............. | 24/600.1 |
| D434,971 | S * | 12/2000 | Cheng ................... | D8/367 |
| D444,685 | S * | 7/2001 | Shenkel et al. .......... | D8/18 |
| D448,655 | S * | 10/2001 | Lai ...................... | D8/367 |
| 6,317,940 | B1 * | 11/2001 | Matoba et al. ........... | 24/600.9 |
| D468,997 | S * | 1/2003 | Chang ................... | D8/356 |
| 6,519,818 | B1 * | 2/2003 | Chang ................... | 24/599.4 |
| 6,601,274 | B1 * | 8/2003 | Gartsbeyn ............... | 24/599.8 |
| D484,393 | S * | 12/2003 | Chang ................... | D8/367 |
| 6,694,574 | B1 * | 2/2004 | Sheng ................... | 294/82.11 |

* cited by examiner

*Primary Examiner*—Eileen D. Lillis
*Assistant Examiner*—Paul T. Chin
(74) *Attorney, Agent, or Firm*—Lee, Hong, Degerman, Kang & Schmadeka

(57) ABSTRACT

A dual lever locking hook comprises a hook member having a mounting portion and a catching portion, first and second locking levers, and a connecting member rotatably coupled to the hook member. The locking levers are affixed to the hook member at the mounting portion and latch onto the hook member at the catching portion. The arrangement of the locking levers at the mounting portion provides a biasing condition which prevents a breach of the locking hook.

9 Claims, 5 Drawing Sheets

DUAL LEVER LOCKING HOOK

CROSS-REFERENCE TO RELATED APPLICATIONS

Pursuant to 35 U.S.C. § 119(a), this application claims the benefit of earlier filing date and right of priority to the Korean Application No. 2002-24769, filed on Aug. 20, 2002, and entitled "Dual Fixing Hook," the content of which is hereby incorporated by reference herein in its entirety.

BACKGROUND OF THE INVENTION

1. Field of the Invention

The present invention relates to a locking hook, and more particularly, to a dual lever locking hook constructed to securely and safely hold an article so as not to be disengaged from the hook.

2. Description of the Prior Art

Generally, a locking hook comprises a curved member used for holding an article, wherein the first end of the hook is connected to a main or first body such as a bag, etc., and the second end is connected to a second article to be held, such as a bag strap.

Referring to FIG. 1, sectional views of a conventional locking hook, in closed and open positions, are shown. The conventional locking hook comprises a hook member 100, an anti-separation unit 200, a knob 220, a breach preventing member 240, a biasing member 300 and a connecting member 400. The body of hook 100 comprises an internal hollow cylinder 120, which extends therefrom integrally and has an elongated slot 140 formed on one side.

In order to hold an article A, a user first applies force onto the knob 220 along the elongated slot 140, so that the breach preventing member 240 is glidingly inserted into the hollow cylinder 120 of the hook member 100. When the hook member 100 is opened, the user catches the loop or catching means of article A. Then the user releases the force applied to the knob 220 after hanging the article A on the hook 100. When the force applied to the knob 220 is released, the breach preventing member 240 is forced out of the hollow cylinder 120 due to the biasing force of the biasing member 300 installed in the hollow cylinder 120.

Such a conventional locking hook, however, requires a multitude of components such as the biasing member 300 and the knob 220, which in turn increase manufacturing cost of the hook. The manufacturing process is further complicated in that the hollow cylinder 120 and the elongate slot 140 must be formed on the hook member 100.

Another disadvantage of the conventional hook is that since the knob 220 must project sufficiently away from the hollow cylinder 120 in order to facilitate usage, an article may be separated if any unintentional external force is applied on the knob 220 in the direction opposite to the elastic bias of the biasing member. In addition, the lower end of the hook member 100 only contacts one end of the breach preventing member 240. Therefore, when a load is applied to the article A hanging on the hook 100 in the direction toward the contacting end of the breach preventing member 240, the load may force the separation of the member 240 from the end of the hook member 100. Thus the article A may be unintentionally separated from the hook member 100.

Therefore, a new locking hook is needed to overcome the deficiencies and disadvantages of the prior art.

BRIEF SUMMARY OF THE INVENTION

The present invention is directed to a dual lever locking hook to securely and safely hold an article.

Additional features and advantages of the invention will be set forth in the description, or may be learned by practice of the invention. The objectives and other advantages of the invention will be realized and attained by the structure particularly pointed out in the written description and claims hereof as well as the appended drawings.

In accordance with one aspect of the invention, a dual lever locking apparatus comprises a hook member comprising a mounting portion and a catching portion; first and second locking levers affixed to the hook member at the mounting portion to latch onto the hook member at the catching portion; and a connecting member rotatably coupled to the hook member. In some embodiments, the first and second locking levers each comprise first and second elongated portions having upper and lower ends, wherein the first elongated portion is shorter than the second elongated portion; a latching portion connecting first ends of the first and second elongated portions; and first and second biasing portions formed on second ends of the first and second elongated portions, respectively.

In one or more embodiments, the mounting portion comprises first and second mounting holes to receive the first and second biasing portions, respectively, of the first locking lever; and third and fourth mounting holes to receive the first and second biasing portions, respectively, of the second locking lever. The catching portion comprises a first catching portion extending from the hook member, the first catching portion comprising a raised extension to engage the latching portion of the first locking lever; and a second catching portion extending from the hook member and located above the first catching portion, wherein the second catching portion has a raised extension to engage the latching portion of the second locking lever.

In accordance with one aspect of the invention, the hook member further comprises a tapered hub having a distal end and a first diameter; and an retainer with a second diameter greater than the first diameter of the hub and permanently affixed to the distal end of the hub. The connecting member comprises a collar to couple the connecting member to the hub. The hook member may further comprise raised ridges along the exterior surface of the hook member.

A connector mechanism according to one embodiment of the invention comprises a hook-shaped member comprising a mounting portion and a catching portion; first and second locking levers affixed to the hook member at the mounting portion to latch onto the hook member at the catching portion. The first and second locking levers each comprise first and second elongated portions having upper and lower ends, wherein the first elongated portion is shorter than the second elongated portion; a latching portion connecting first ends of the first and second elongated portions; and first and second biasing portions formed on second ends of each of the first and second elongated portions, respectively, for engaging the mounting portion.

In accordance with one or more embodiments, the dual lever locking apparatus of the invention comprises a hook member comprising at least one mounting portion; first and second catching portions; first and second locking levers, each lever having first and second ends, the first ends of the first and second levers respectively engaging the first and second catching portions, and the second end of each lever respectively affixed to the hook member at said first and second mounting portions, wherein the second end of each lever comprises first and second biasing portions for engaging the mounting portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments. Reference will now be made in detail to one or more embodiments of the invention, examples of which are illustrated in the accompanying drawings.

DETAILED DESCRIPTION OF THE PREFERRED EMBODIMENT

Figure 1:
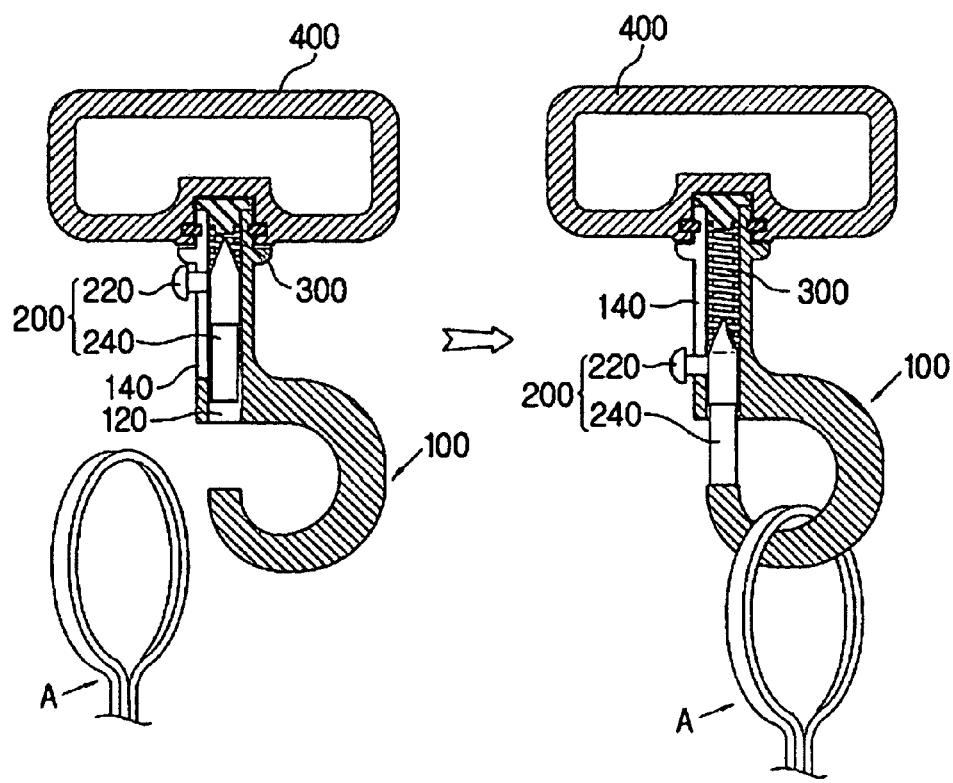
FIG. 1 illustrates sectional views of a conventional locking hook, in closed and open positions.
Figure 2:
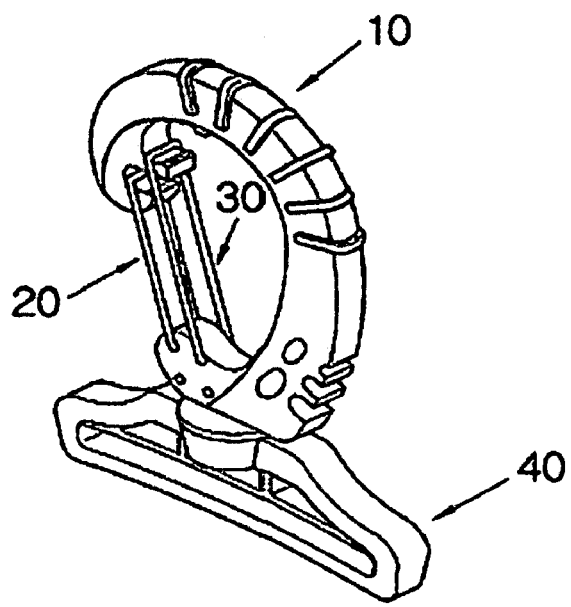
FIG. 2 illustrates a perspective view of a dual lever locking hook in accordance with an embodiment of the invention.
Figure 3:
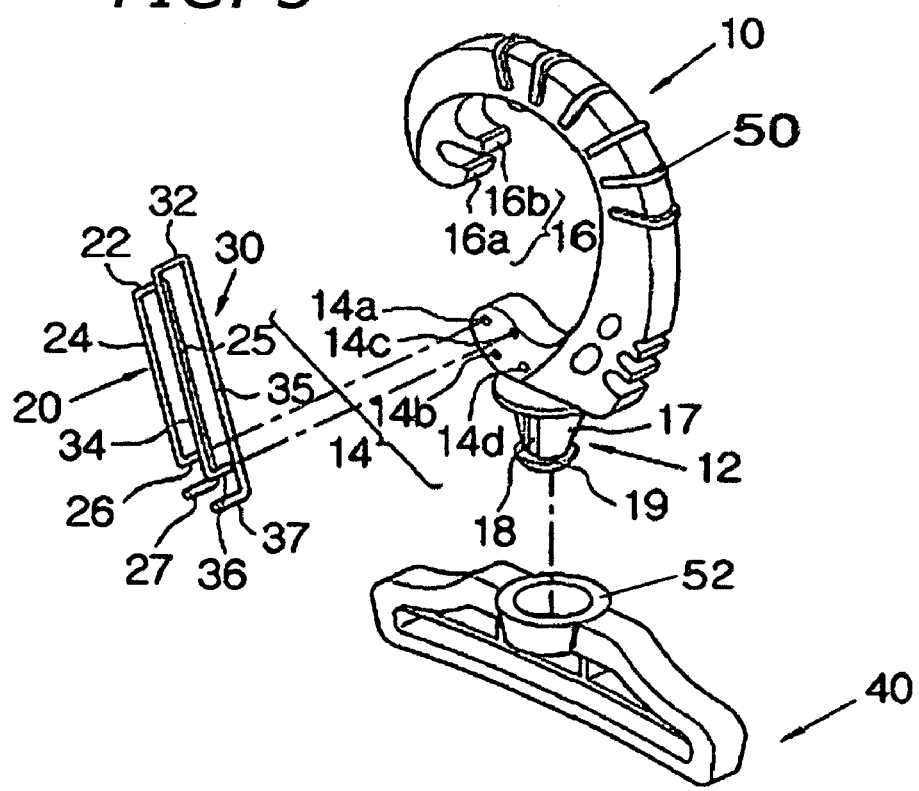
FIG. 3 illustrates an exploded perspective view of the dual lever locking hook of FIG. 2.

Referring to FIGS. 2 & 3, a dual lever locking hook comprises a hook member 10, a first locking lever 20, a second locking lever 30, and a rotating connecting member 40. The hook member 10 is curved in order to catch and hold an article thereon. Preferably, the hook member 10 includes raised ridges 50 along the exterior of the member to provide additional friction for the user when using the dual lever locking hook. The hook member 10 comprises a hub 12, a mounting portion 14, and a catching portion 16.

The hub 12 comprises a spindle 17 extending from the base of the hook member 10 and an annular retainer 19 situated on the distal end of the spindle 17. The connecting member 40, which is configured to connect the dual lever locking hook to straps, for example, and other similar articles, includes a collar 52 which is coupled to the hub 12 by snap fit or other means known in the art. The spindle 17 is tapered distally and grooves 18 are formed on the surface of the spindle, preferably on opposing sides, for facilitating the coupling of the rotating connecting member 40. The diameter of the annular retainer 19 is larger than that of the spindle 17 in order to prevent the decoupling of the connecting member 40 from the hub 12.

The first and second locking levers 20 and 30 are fixed to the hook member 10, preferably in parallel, at the mounting portion 14. The mounting portion comprises four horizontal mounting holes 14a, 14b, 14c, and 14d. The first locking lever 20, as described below, is fixed into the first and second mounting holes 14a and 14b. Similarly, the second locking lever 30 is fixed in to the third and fourth mounting holes. Holes 14a and 14c are situated a certain distance above the mounting holes 14b and 14d on the mounting portion 14.

The first locking lever 20 comprises a horizontal latching portion 22, first and second elongated vertical portions 24 and 25, and first and second horizontal bias portions 26 and 27. The first and second elongated vertical portions 24 and 25 serve to prevent a breach of the dual lever locking hook and are preferably longer in length than the horizontal portions 22, 26 or 27. In addition, the second vertical portion 25 is longer in length than the first vertical portion 24 by approximately the same distance between horizontal mounting holes 14a and 14b located on the mounting portion 14. The first and second bias portions 26 and 27 are inserted into the horizontal mounting holes 14a and 14b, respectively, in opposing directions. The bias portions 26 and 27 may also include small vertical segments at their distal ends to prevent removal from the mounting holes 14a and 14b.

Similarly, the second locking lever 30 comprises a horizontal latching portion 32, first and second elongated vertical portions 34 and 35, and first and second horizontal bias portions 36 and 37. The first and second elongated vertical portions 34 and 35 also serve to prevent a breach of the dual lever locking hook and are preferably longer in length than the horizontal portions 32, 36 or 37. In addition, in certain embodiments, the second vertical portion 35 is longer in length than the first vertical portion 34 by approximately the same distance between horizontal mounting holes 14c and 14d located on the mounting portion 14. The first and second bias portions 36 and 37 are inserted into the horizontal mounting holes 14c and 14d, respectively. The bias portions 36 and 37 may also include small vertical segments at their distal ends to prevent removal from the mounting holes 14c and 14d. The second locking lever 30 is longer in total length than the first locker lever 20, in one or more embodiments.

The catching portion 16 comprises first and second catching portions 16a and 16b. The first locking lever 20 locks the hook member by latching on to the catching portion 16a. The second catching portion 16b is positioned over the first catching portion 16a. The first and second catching portions 16a and 16b both include, for example, raised hook-shaped extensions that respectively receive horizontal latching portions 22 and 32. The horizontal latching portion 22 of the first locking lever 20 engages the catching portion 16 by latching onto the first catching portion 16a. Similarly, the latching portion 32 of the second locking lever engages the catching portion 16 by latching onto the second catching portion 16b.

Figure 4:
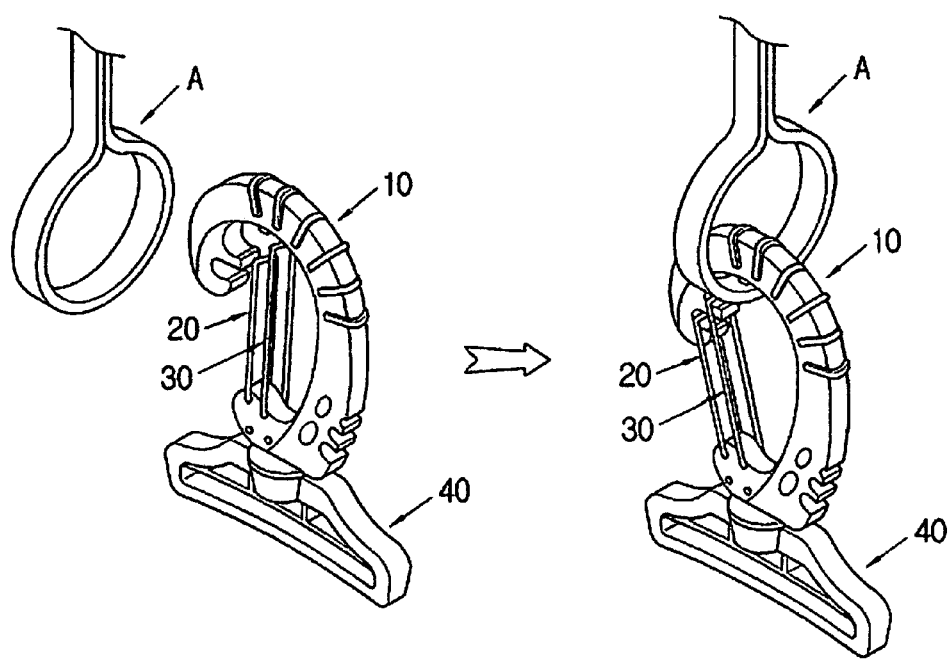
FIG. 4 illustrates the operation of the dual lever locking hook of FIG. 2.

Referring to FIG. 4, the operation of an embodiment of the dual lever locking hook is provided. In order to hold an article A within the hook member 10, a certain amount of force is applied radially inward to the locking levers 20 and 30 to disengage or unlatch the levers 20 and 30 from and away from the catching portion 16. The amount of force applied by the user is greater than the natural biasing forces of both locking levers, which are created by the arrangement of the locking levers 20 and 30 on the mounting portion 14.

When the user applies a radially inward force to the locking lever 20, a force in the opposite direction is applied to the horizontal bias portions 26 and 27 (see FIG. 3). This opposing force is a function of the difference in distance between the elongated vertical portions 24 and 25 of the locking lever 20. With the bias portions 26 and 27 are inserted into the mounting holes 14a and 14b of the mounting portion 14, a resistive condition is created by this arrangement that promotes a reactive force against the radially inward force applied by the user. Similarly, the force applied to the lever 20 is transmitted to the lever 30. Lever 30 has the same arrangement and resistive condition in relation to biasing portions 36 and 37 and mounting holes 14c and 14d, respectively. Consequently, when the article A engages the open hook member 10 and the force applied to the locking levers 20 and 30 is released, the levers 20 and 30 return to their original positions.

Figure 5A:
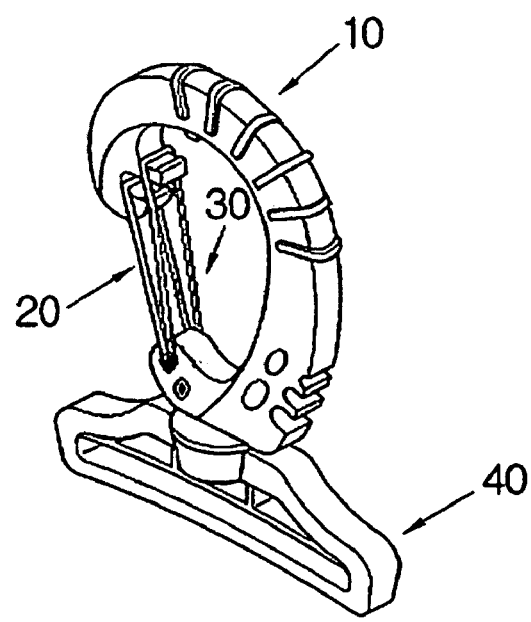
FIG. 5A illustrates a perspective view of a dual lever locking hook in accordance with another embodiment of the invention.
Figure 5B:
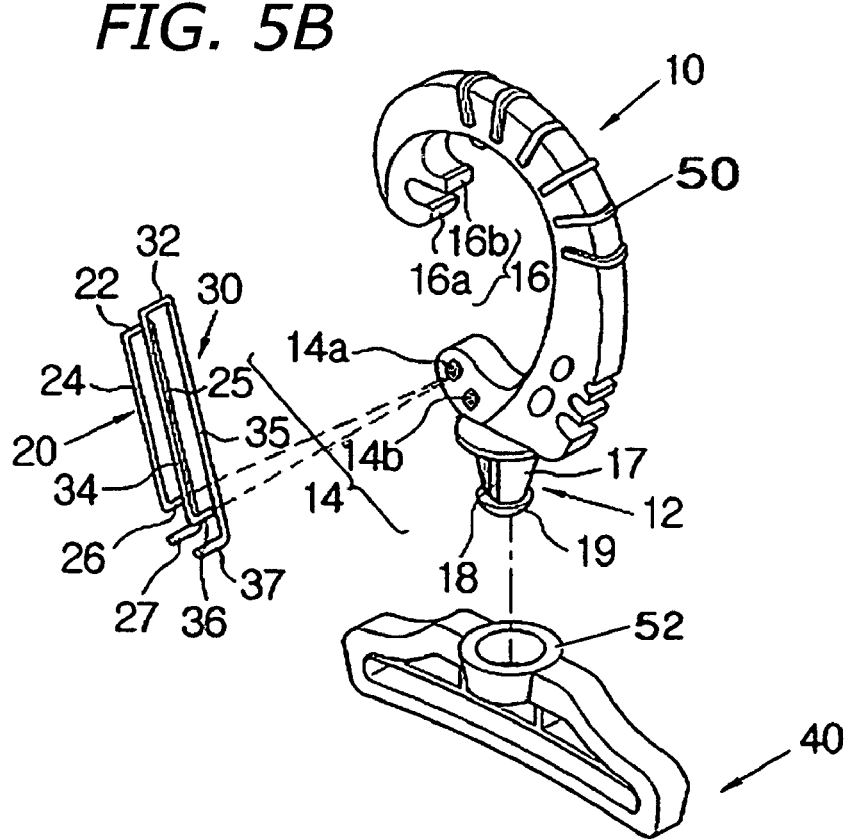
FIG. 5B illustrates an exploded perspective view of the dual lever locking hook of FIG. 5A.
Figure 6A:
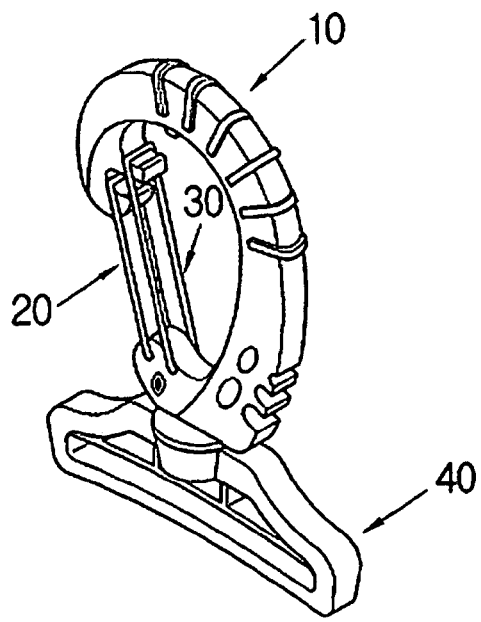
FIG. 6A illustrates a perspective view of a dual lever locking hook in accordance with another embodiment of the invention.
Figure 6B:
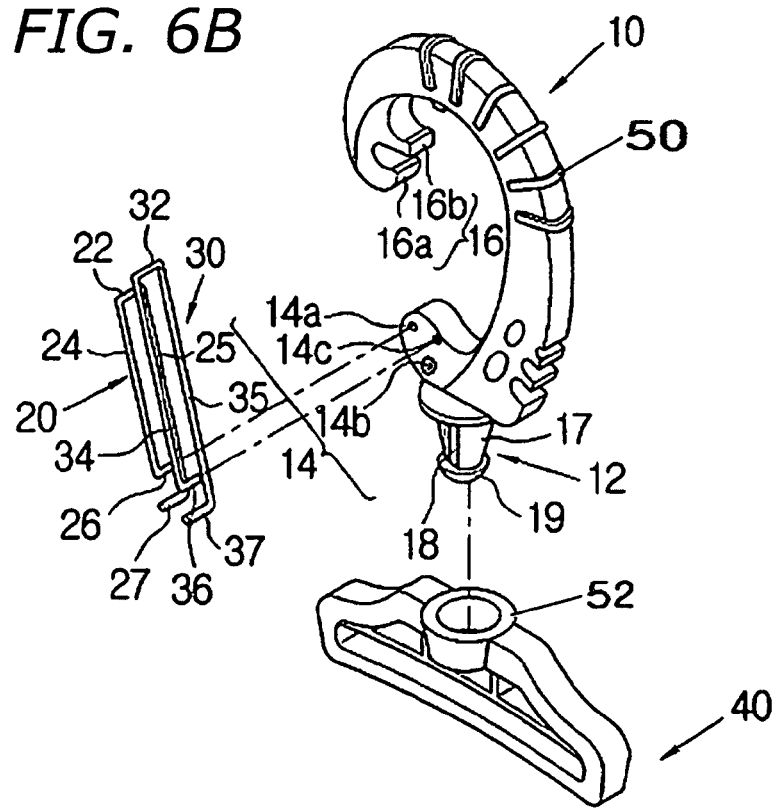
FIG. 6B illustrates an exploded perspective view of the dual lever locking hook of FIG. 6A.

Referring to FIGS. 5A and 5B, the first and second locking levers 20 and 30 of this embodiment of the dual lever locking hook are fixed to the hook member 10, preferably in parallel, at the mounting portion 14. The mounting portion in this case comprises two horizontal mounting holes 14a and 14b. The first locking lever 20, as described above, is fixed into the first and second mounting holes 14a and 14b. The second locking lever 30 is also fixed in to the first and second mounting holes 14a and 14b. Alternatively, referring to FIGS. 6A and 6B, the mounting portion may comprise three horizontal mounting holes 14a, 14b and 14c. In this embodiment, the first locking lever 20 is fixed into the first and second mounting holes 14a and 14b and the second locking lever 30 is fixed in to the third and second mounting holes 14c and 14b.

As described above, the present invention provides a dual lever locking hook with which an article is securely and safely held within a hook member by means of two locking levers. By means of these levers, an article held on the hook member cannot be inadvertently disengaged since two separate means of preventing a breach of the hook are present. Additionally, since each locking lever 20 and 30, the connecting member 40, and hook member 10 can all have a monolithic construction, a plurality of likely more expensive components such as a biasing member, a knob, etc. is not required. A simple manufacturing process for dual lever locking hook is implemented and resultantly, the invention has a significantly reduced manufacturing cost.

Although particular embodiments of the invention have been illustrated and described, it will be apparent to those skilled in the art that changes and modifications may be made without departing from the invention in its broader aspects, and therefore, the appended claims are to encompass within their scope all changes, modifications and equivalents that fall within the true scope of the invention.

What is claimed is:

1. A dual lever locking apparatus comprising:
   a hook member comprising first and second mounting portions and respective first and second catching portions; and
   first and second locking levers respectively affixed to the hook member at the first and second mounting portions to latch onto an inside portion of the same hook member respectively at the first and second catching portions, wherein:
   the first locking lever latches onto the first catching portion to form a first closed loop, and
   the second locking lever latches onto the second catching portion to form a second closed loop comprising the first closed loop, such that the first and second levers in a closed position are approximately parallel to one another;
   wherein the first and second locking levers each comprise:
   first and second elongated portions having upper and lower ends, wherein the first elongated portion is shorter than the second elongated portion;
   a latching portion connecting first ends of the first and second elongated portions; and
   first and second biasing portions formed on second ends of the first and second elongated portions, respectively.

2. The dual lever locking apparatus of claim 1, wherein the mounting portion comprises:
   first and second mounting holes to receive the first and second biasing portions, respectively, of the first locking lever; and
   third and fourth mounting holes to receive the first and second biasing portions, respectively, of the second locking lever.

3. The dual lever locking apparatus of claim 1, wherein the mounting portion comprises first and second mounting holes to receive the first and second biasing portions, respectively, of the first and second locking levers.

4. The dual lever locking apparatus of claim 1, wherein the mounting portion comprises:
   a first mounting hole to receive the first biasing portion of the first locking lever;
   a second mounting hole to receive the second biasing portions of the first and second locking levers; and
   a third mounting hole to receive the first biasing portion of the second locking lever.

5. The dual lever locking apparatus of claim 1, wherein the catching portion comprises:
   a first catching portion extending from the hook member, the first catching portion comprising a raised extension to engage the latching portion of the first locking lever; and
   a second catching portion extending from the hook member and located above the first catching portion, wherein the second catching portion has a raised extension to engage the latching portion of the second locking lever.

6. The dual lever locking apparatus of claim 1, wherein the hook member further comprises:
   a tapered hub having a distal end and a first diameter; and
   a retainer with a second diameter greater than the first diameter of the hub and permanently affixed to the distal end of the hub.

7. The dual lever locking apparatus of claim 6, wherein a connecting member rotatably coupled to the hook member comprises a collar to couple the connecting member to the hub.

8. The dual lever locking apparatus of claim 1, wherein the hook member further comprises raised ridges along the an exterior surface of the hook member.

9. A dual lever locking apparatus comprising:
   a hook member comprising:
   at least one mounting portion positioned at a first end of the hook member;
   first and second juxtaposed catching portions positioned at a second end of the hook member opposite the first end;
   first and second locking levers, each lever having first and second ends, wherein
   the first end of the first lever engaging the first catching portion,
   the first end of the second lever engaging the second catching portion,
   the second end of each lever comprises first and second biasing portions for engaging in the mounting portion,
   the first locking lever latches onto the first catching portion to form a first closed loop, and
   the second locking lever latches onto the second catching portion to form a second closed loop comprising the first closed loop such that the first and second levers in a closed position are approximately parallel to one another;

wherein the first and second locking levers each comprise:

first and second elongated portions having upper and lower ends, wherein the first elongated portion is shorter than the second elongated portion;

a latching portion connecting first ends of the first and second elongated portions; and first and second biasing portions formed on second ends of the first and second elongated portions, respectively.

* * * * *